United States Patent [19]

Ruff et al.

[11] 4,313,997
[45] Feb. 2, 1982

[54] PERLITE BOARDS AND METHOD FOR MAKING SAME

[75] Inventors: David L. Ruff, Torrance; Narikottile G. Nath, Carson, both of Calif.

[73] Assignee: Grefco, Inc., Bala Cynwyd, Pa.

[21] Appl. No.: 168,483

[22] Filed: Jul. 14, 1980

[51] Int. Cl.³ .................. B32B 5/16; B32B 11/02; B32B 19/02

[52] U.S. Cl. .............. 428/220; 106/DIG. 2; 156/62.2; 264/123; 428/403; 428/404; 428/405; 428/407

[58] Field of Search .......... 428/403, 407, 489, 404, 428/220, 405; 106/84, DIG. 2; 264/123; 156/62.2; 427/220, 221

[56] References Cited

U.S. PATENT DOCUMENTS

| | | |
|---|---|---|
| 2,275,816 | 3/1942 | Ericson . |
| 2,289,250 | 7/1942 | Denning . |
| 2,625,512 | 1/1953 | Powell . |
| 2,626,872 | 1/1953 | Miscall . |
| 2,634,207 | 4/1953 | Miscall et al. . |
| 2,935,412 | 5/1960 | Gzemski et al. . |
| 3,015,626 | 1/1962 | Kingsbury . |
| 3,030,218 | 4/1962 | Robinson . |
| 3,042,578 | 7/1962 | Denning . |
| 3,169,927 | 2/1965 | Matsch . |
| 3,176,354 | 4/1965 | Blau et al. . |
| 3,203,813 | 8/1965 | Gajardo et al. . |
| 3,510,391 | 5/1970 | Bolster et al. .............. 428/314 |
| 3,522,067 | 7/1970 | MacArthur . |
| 3,598,672 | 8/1971 | Heller . |
| 3,623,938 | 11/1971 | Jenkins . |
| 3,655,564 | 4/1972 | Barrington . |
| 3,769,065 | 10/1973 | Dunn . |
| 3,886,076 | 5/1975 | Venable . |
| 3,903,706 | 9/1975 | Gzemski . |
| 3,904,539 | 9/1975 | Ruff . |
| 4,039,706 | 8/1977 | Tajima et al. .............. 428/489 |
| 4,107,376 | 8/1978 | Ishikawa ................. 428/404 |
| 4,175,158 | 11/1979 | Saunders ................. 428/404 |
| 4,175,159 | 11/1979 | Raleigh ................... 428/404 |
| 4,201,833 | 5/1980 | Kirsch et al. ............. 428/404 |
| 4,212,755 | 7/1980 | Ruff et al. . |
| 4,241,138 | 12/1980 | Chentemirov et al. ......... 428/407 |

*Primary Examiner*—William J. Van Balen
*Attorney, Agent, or Firm*—Everett H. Murray, Jr.; Brian G. Brunsvold; Thomas L. Irving

[57] ABSTRACT

Perlite board made from expanded perlite and a binder having the property of permanent tackiness in the dry state. The board may be made by expanding the perlite, adding a tacky resin emulsion to the perlite, drying the mixture and forming it into a board-like product.

14 Claims, No Drawings

PERLITE BOARDS AND METHOD FOR MAKING SAME

FIELD OF THE INVENTION

The present invention relates to perlite boards and, more particularly, to relatively thick perlite boards formed of expanded perlite and a tacky binder.

BACKGROUND OF THE INVENTION

Perlite ore is a naturally occurring volcanic mineral consisting primarily of silica, alumina and a small amount of water. Exposure of perlite ore to temperatures in the range of 1700 to 2100° F. softens the mineral and causes the water to expand to form a light cellular mineral particle. Due to the low density and low thermal conductivity of expanded perlite, it has found utility as a thermal insulator. Expanded perlite has been used in its particulate form, for example, as loose-fill insulation. A co-pending application, Ser. No. 875,632, filed Feb. 6, 1978, now U.S. Pat. No. 4,212,755, discloses a loose-fill insulation of expanded perlite particles coated with a material rendering the particles slightly tacky.

It is also known to use expanded perlite as a component of an insulating board. Conventional perlite board is made from an aqueous slurry of fibers, sizing and expanded perlite, that is formed into a board by a Fourdrinier process and subsequently dried. Because the mixture of fiber and expanded perlite is an efficient thermal insulator, it requires a great amount of energy to remove the water component of the slurry from the core of a thick, conventionally formed perlite board. Therefore, it has been necessary to laminate two relatively thin perlite boards to get a product thickness greater than about 1 ¼ inch. The lamination of such boards significantly increases the cost of production and renders the product susceptible to potential problems with delamination of the layers.

The present invention overcomes this difficulty of the prior art by producing thick, expanded perlite without resorting to either an energy inefficient Fourdrinier process or lamination of thin boards. In addition, the product may be formulated in such a manner that it is flexible.

SUMMARY OF THE INVENTION

The invention is directed to perlite boards comprised of particles o expanded perlite and a binder having the property of permanent tackiness in the dry state. Preferably, the binder is an organic polyacrylic rsin compound. The preferred composition comprises from about 65 percent to about 95 percent by weight particles of expanded perlite and from about 5 percent to about 35 percent by weight binder, expressed as a solid. Optionally, fibers, water-repellents and other additives may be added to the product.

The invention is further directed to a method for producing expanded perlite boards of a thickness greater than about 1 inch comprising the steps of: adding a tacky resin emulsion to expanded perlite to form a composition; drying the composition; and fabricating the dried composition into boards. Optionally, the process further includes the steps of mixing both a glass fiber and a dilute asphalt emulsion with the expanded perlite and drying the mixture of asphalt emulsion and expanded perlite prior to adding the tacky emulsion.

DETAILED DESCRIPTION OF THE PREFERRED EMBODIMENTS

In accordance with the present invention, and as embodied herein, there are provided perlite boards having a thickness greater than about 1 inch comprised of expanded perlite and a permanently tack binder. The boards are particularly useful as insulation boards because, aside from the fact they provide effective thermal insulation, they are flexible and resilient. For example, the boards may be shaped at the job site to conform to the shape of large radius tanks and held in place by mechanical means. Other uses will be apparent to those skilled in the art.

The binder, which may be organic or inorganic, is especially selected for the property of permanent tackiness in the dry state. Preferably, a self-crosslinking permanently tacky polymer, such as an acrylic polymer is used. Examples of organic materials useful as binders include such polymer resin types as styrene-butadiene, vinylidene chloride-butadiene, carboxylated vinyl acetate-ethylene, isobutylene, vinyl ethers, vinyl chlorides, vinyl propionate, natural rubber, polyisoprene, polyamid, epoxy and combinations thereof.

Union Carbide UCAR Latex 152 is a specific example of a polyacrylate resin useful in the practice of the invention. Bondmaster K800 by National Adhesives is another example of a compound adhesive that meets the tackiness requirement of this disclosure. The total binder, expressed as solids, comprises from about 5 to about 35 percent by weight of the board.

The perlite, comprising 65-95 percent by weight of the board, consists in its expanded form of particles, milled or unmilled, ranging in size from less than 0.1 mm to about 3 mm. Commercial sources for such perlite are readily available. Bulk density may range from about one pound per cubic foot (pcf) to about ten pounds pcf. Optionally, the perlite may be previously treated to contain about 3 percent by weight emulsified asphalt solids. Methods for so treating perlite are well-known in the art.

Optionally, reinforcing fibers, waterproofing materials, and fire retardants may form part of the composition. If bituminous or waxy water-repellent materials are used, they comprise from about 1.0% to about 10% of the perlite by weight. These materials may be applied to the perlite from molten states or as emulsions by methods described in U.S. Pat. Nos. 2,626,872 and 2,634,208 to Miscall et al. If silicone emulsions are used, the silicone comprises from about 0.01% to about 2% of the perlite by weight. The silicon emulsions may be applied directly to the perlite as it exits the expander by means well-known in the art, or it may be added to and applied together with the tacky binder.

If used, fine fibers comprise from about 1% to about 15% by weight of the board. Typically, hammermilled waste newsprint, with fibers from less than about 0.5 to about 5 mm in length are used. Glass fiber, mineral wool, and other such materials may also be used. Additionally, fibers, such as reclaimed nylon tire cord, are capable of use. To prevent balling up of the fibers, they are preferably mixed with the perlite by utilizing air as the mixing fluid. The binder may be sprayed onto the perlite simultaneously with the air mixing of perlite and fibers or after the mixing thereof.

A compatible fire retardant, such as diammonium phosphate, may also be used. If so, it may be dissolved in the binder liquid and sprayed simultaneously onto the perlite.

The basic method of producing the composition of the invention comprises the steps of expanding the perlite and mixing the expanded perlite with an aqueous, dispersion or emulsion of an organic or inorganic binder, which has the property of permanent tackiness in the dry state. Mixing of the perlite and the binder may be accomplished by spraying the binder onto the perlite. Although the binder may be sprayed onto the perlite in a solvent-based form, the emulsion form is preferred for safety reasons.

Mixing may occur over a temperature range running from room temperature upward to any temperature below the decomposition point of the tacky resin binder. Other co-binders, wellknown in the art, may be added along with the tacky binder to impart desired properties.

The following examples, in conjunction with the general and detailed description above, more fully illustrate the nature and character of the present invention.

EXAMPLE I

One hundred grams of expanded perlite, previously treated to contain 3% of emulsified asphalt solids, were placed in a five-gallon drum fixed at an angle of 45° above horizontal and driven by a motor to rotate at 60 revolutions per minute. The perlite was 100% −16 +325 mesh (Tyler Sieve) and had a loose weight density of 4 pcf., when tested by methods commonly known in the art.

Fifty grams of aqueous, emulsified, tacky, polyacrylate resin, such as Union Carbide UCAR Latex 152, containing 50% solids by weight was diluted with 50 grams water and sprayed onto the coated perlite. After the spraying was complete, the perlite-binder blend was removed from the drum, air dried and bagged loose. The dry composition contained 77.6% perlite, 2.4% emulsified asphalt solids and 20% tacky resin adhesive solids. The material was dark brown in color, non-dusty and moderately water repellent.

EXAMPLE II

One hundred grams perlite such as described in Example I, but without the asphalt treatment, is placed in the rotating drum. Fifty grams of tacky polyacrylate resin binder, Union Carbide UCAR Latex 152 emulsion adhesive was diluted with 50 grams of water. Two grams of silicone emulsion was added and mixed into the binder emulsion mixture which was sprayed onto the perlite in the rotating drum.

The resultant product was a low density, white, dust-free, highly water repellent, tacky powder, similar in properties to the product of Example I. When dry, the powder consisted of 79.5% weight percent perlite, 19.9% weight percent tacky binder and 0.6% weight percent silicone and was water repellent.

The compositions of Examples I and II had the properties enabling such compositions to be formed into boards within the scope of the invention as defined herein.

To manufacture boards from such compositions, the perlite particles are expanded in a conventional expander by a continuous process, collected by an air pick-up and conveyed pneumatically. Optionally, at any convenient point in the conveying system, fibers may be continuously injected into the system. Further downstream from the expander, at a point where the perlite temperature is below the decomposition temperature of asphalt, a dilute asphalt emulsion may optionally be sprayed-injected into the perlite or perlite-fiber stream. Further downstream at a point where the perlite-asphalt mixture has dried substantially and the temperature is low enough to avoid decomposition of the tacky resin binder, the tacky resin emulsion and, optionally, silicone emulsion, is injected into the flowing, pneumatically-conveyed stream of perlite and fibers by one or more spray nozzles.

The heat from the expansion is sufficient to dry substantially the composition. The dried composition may then be deposited on the belt of a pressure conveyor for fabrication into a boardlike product.

The invention in its broader aspects is not limited to the specific details shown and described and departures may be made from such details without departing from the principles of the invention and without sacrificing its chief advantages.

What is claimed is:

1. A perlite board having a thickness greater than about 1 inch said perlite board comprising particles of expanded perlite and a binder having the property of permanent tackiness in the dry state.

2. The board of claim 1 wherein said perlite comprises from about 65% to about 95% by weight of the final composition and said binder, expressed as a solid, comprises from about 5% to about 35% by weight of the final composition.

3. The board of claim 1 further including a reinforcing fiber material.

4. The board of claim 3 further including a waterproofing material.

5. The board of claim 1 wherein he binder is organic.

6. The board of claim 5 wherein the binder is a polyacrylic resin compound.

7. The board of claim 1 wherein the binder is inorganic.

8. A perlite board consisting essentially of 65 to 95% by weight expanded perlite, 5 to 35% by weight organic binder, said binder having the property of permanent tackiness in the dry state, reinforcing fibers in an amount up to about 15% by weight, asphalt in an amount up to 10% by weight, silicone in an amount up to 2% by weight, said board having a density in the range of from about 7 to 15 pounds per cubic foot.

9. A process for making expanded perlite board of a thickness greater than about 1 inch comprising the steps of: expanding said perlite; adding a tacky resin emulsion having the property of permanent tackiness in the dry state to said perlite to form a mixture; drying said mixture; and fabricating said dried mixture into boards.

10. A process according to claim 9 including the step of mixing fiber with said expanded perlite.

11. A process according to claim 9 including the steps of mixing a dilute asphalt emulsion with the expanded perlite; and drying the resulting mixture of the asphalt emulsion and the perlite prior to the step of adding said tacky resin emulsion.

12. The perlite board of claim 1 wherein said board is flexible and resilient.

13. The perlite board of claim 8 wherein said board is flexible and resilient.

14. The process of claim 9 wherein said boards are flexible and resilient.

* * * * *